(12) United States Patent
Nawa et al.

(10) Patent No.: US 8,093,168 B2
(45) Date of Patent: ***Jan. 10, 2012

(54) $ZRO_2$-$AL_2O_3$ COMPOSITE CERAMIC MATERIAL AND PRODUCTION METHOD THEREFOR

(75) Inventors: Masahiro Nawa, Katano (JP); Hideo Nakanishi, Hirakata (JP); Yasuhiko Suehiro, Osaka (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/072,893

(22) Filed: Mar. 28, 2011

(65) Prior Publication Data

US 2011/0172081 A1 Jul. 14, 2011

Related U.S. Application Data

(63) Continuation of application No. 12/123,356, filed on May 19, 2008, now Pat. No. 7,928,028, which is a continuation-in-part of application No. 11/085,039, filed on Mar. 22, 2005, now abandoned.

(30) Foreign Application Priority Data

Mar. 23, 2004 (JP) ................................. 2004-085102

(51) Int. Cl.
*C04B 35/106* (2006.01)
(52) U.S. Cl. ...................................................... 501/105
(58) Field of Classification Search ................... 501/105
See application file for complete search history.

(56) References Cited

U.S. PATENT DOCUMENTS

| | | |
|---|---|---|
| 5,728,636 A | 3/1998 | Nawa et al. |
| 5,863,850 A | 1/1999 | Nawa et al. |
| 7,012,036 B2 | 3/2006 | Nawa et al. |

(Continued)

FOREIGN PATENT DOCUMENTS

CN 1386067 A 12/2002

(Continued)

OTHER PUBLICATIONS

Nawa, Masahiro et al., "The Effect of $TiO_2$ Addition on Strengthening and Toughening in Intragranular Type of 12Ce-TZP/$Al_2O_3$ Nanocomposites", Journal of the European Ceramic Society, 1998, vol. 18, No. 3, pp. 209-219.

(Continued)

*Primary Examiner* — Karl Group
(74) *Attorney, Agent, or Firm* — Cheng Law Group, PLLC

(57) ABSTRACT

A $ZrO_2$—$Al_2O_3$ composite ceramic material having excellent wear resistance, hardness, strength and toughness is provided. This ceramic material comprises a $ZrO_2$ phase composed of 90 vol % or more of tetragonal $ZrO_2$, and containing 10 to 12 mol % of $CeO_2$ as a stabilizer, and an $Al_2O_3$ phase. An amount of the $Al_2O_3$ phase in the ceramic material is in a range of 20 to 70 vol %, and preferably 40 to 70 vol %. In the composite ceramic material, $Al_2O_3$ grains each having a fine $ZrO_2$ grain therein are dispersed. Some of the $Al_2O_3$ grains each having the fine $ZrO_2$ grain therein are trapped within $ZrO_2$ grains to form composite grains. A ratio of the number of the $Al_2O_3$ grains each having the fine $ZrO_2$ grain therein relative to the number of the entire $Al_2O_3$ grains dispersed in the composite ceramic material is 10% or more, and preferably 50% or more.

11 Claims, 1 Drawing Sheet

U.S. PATENT DOCUMENTS

| | | | |
|---|---|---|---|
| 7,056,851 B2 | 6/2006 | Nawa | |
| 2002/0198602 A1 | 12/2002 | Nawa et al. | |

FOREIGN PATENT DOCUMENTS

| | | | |
|---|---|---|---|
| EP | 1 382 586 A2 | 1/2004 | |
| JP | 63-156063 A | 6/1988 | |
| JP | 5-246760 A | 9/1993 | |
| JP | 8-268755 A | 10/1996 | |
| JP | 2004-51481 A | 2/2004 | |

OTHER PUBLICATIONS

European Search Report for the Application No. EP 05 00 6264 dated Jun. 15, 2005.

The First Office Action for the Application No. 2005100656401 from The State Intellectual Property Office of the People's Republic of China dated Apr. 7, 2006.

Notification of Reasons for Refusal for the Application No. 2005-082516 from Japan Patent Office mailed Jun. 23, 2009.

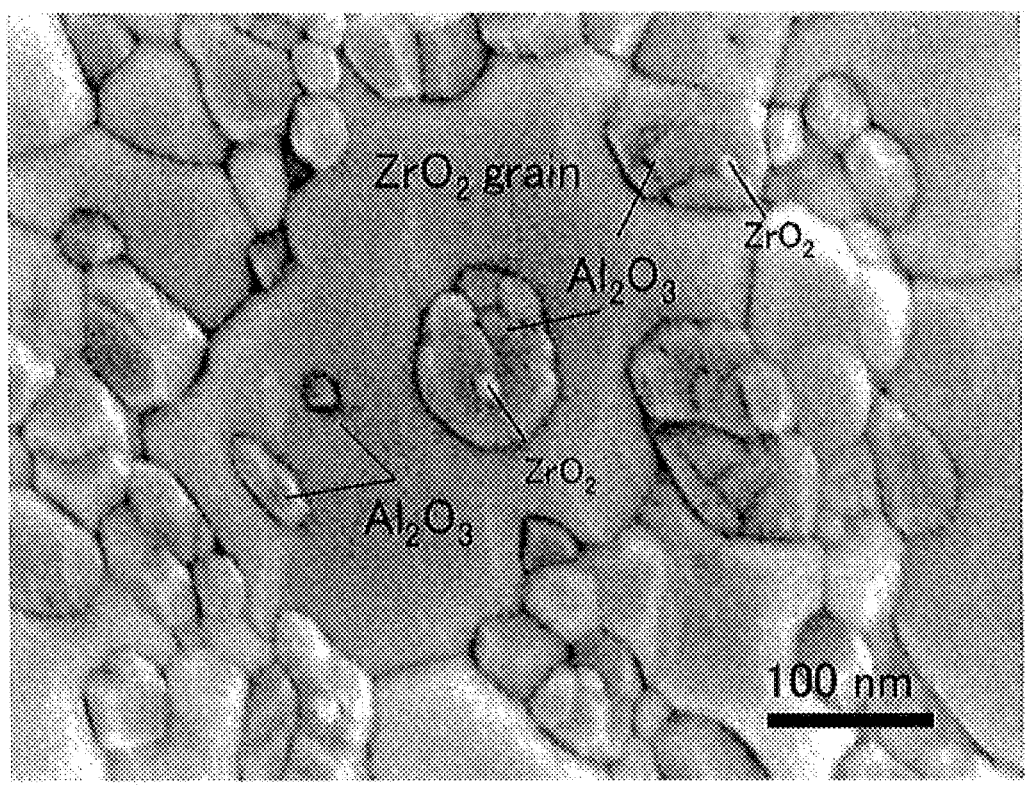
FIGURE

ZrO$_2$-Al$_2$O$_3$ COMPOSITE CERAMIC MATERIAL AND PRODUCTION METHOD THEREFOR

CROSS-REFERENCE TO RELATED APPLICATION

This is a continuation patent application of U.S. patent application Ser. No. 12/123,356 filed on May 19, 2008, now U.S. Pat. No. 7,928,028, which was a continuation-in-part application of U.S. patent application Ser. No. 11/085,039 filed on Mar. 22, 2005, now abandoned, which claims the priority of Japanese Patent Application No. 2004-085102 filed on Mar. 23, 2004, the entire contents of which are hereby incorporated by reference.

BACKGROUND OF THE INVENTION

1. Field of the Invention

The present invention relates to a ZrO$_2$—Al$_2$O$_3$ composite ceramic material with excellent mechanical properties, and a method of producing the same.

2. Disclosure of the Prior Art

As compared with metal and plastic materials, ceramic materials demonstrate excellent hardness, wear resistance, heat resistance and corrosion resistance. As for practical use of the ceramic materials in various application fields, for example, biomaterial parts such as artificial joint and artificial tooth, medical equipments, cutting tools such as drill and surgical knife, mechanical parts for automobile, airplane and space craft used under severe conditions, it is desired to develop a ceramic material having further improved mechanical strength and toughness in a high level. In recent years, a zirconia (ZrO$_2$)-alumina (Al$_2$O$_3$) composite ceramic material has received attention as a potential candidate of the ceramic material.

For example, Japanese patent Early publication [kokai] No. 5-246760 discloses a ZrO$_2$-based composite ceramic sintered body comprising a matrix phase of tetragonal ZrO$_2$ grains containing 5 to 30 mol % of CeO$_2$ and a dispersion phase of fine grains of at least one of selected from the group consisting of Al$_2$O$_3$, SiC, Si$_3$N$_4$ and B$_4$C, which are dispersed within the ZrO$_2$ grains and at grain boundaries of the matrix phase. By the presence of the dispersion phase, a grain growth of the matrix phase is prevented and a fine grained structure of the matrix phase is obtained, so that significant strengthening is achieved mainly due to a reduction in flaw size of the fracture origin.

In addition, U.S. Pat. No. 5,728,636 discloses a ZrO$_2$-based ceramic material having high mechanical strength and toughness, which comprises a tetragonal ZrO$_2$ phase of ZrO$_2$ grains having an average grain size of 5 μm or less, and containing 8 to 12 mol % of CeO$_2$ and 0.05 to 4 mol % of TiO$_2$ as a stabilizer, and an Al$_2$O$_3$ phase of Al$_2$O$_3$ grains having an average grain size of 2 μm or less. In this ceramic material, the Al$_2$O$_3$ grains are dispersed within the ZrO$_2$ grains at a dispersion ratio of 2% or more, which is defined as a ratio of the number of the Al$_2$O$_3$ grains dispersed in the ZrO$_2$ grains relative to the number of the entire Al$_2$O$_3$ grains dispersed in the ceramic material. In addition, by using the combination of CeO$_2$ and TiO$_2$ as the stabilizer, the grain growth of the ZrO$_2$ grains can be enhanced moderately, so that parts of the Al$_2$O$_3$ grains are effectively dispersed within the ZrO$_2$ grains, and a critical stress of a stress induced transformation from the tetragonal ZrO$_2$ to monoclinic ZrO$_2$ is increased.

By the way, as one potential approach for improving wear resistance and hardness of this kind of the ceramic material, it is proposed to increase the additive amount of Al$_2$O$_3$. However, such an increase of the Al$_2$O$_3$ amount generally leads to reductions in mechanical strength and toughness. In above cases, a preferred amount of Al$_2$O$_3$ in the composite ceramic sintered body or the ceramic material is in a range of 0.5 to 50 vol %. When the Al$_2$O$_3$ amount exceeds 50 vol %, Al$_2$O$_3$ becomes the matrix phase, so that it is difficult to maintain a strengthening mechanism based on a stress induced phase transformation of ZrO$_2$. Consequently, considerable reductions in mechanical strength and toughness may occur.

Thus, the previous ZrO$_2$—Al$_2$O$_3$ composite ceramic materials still have a problem to be solved for providing excellent wear resistance and hardness without causing reductions in mechanical strength and toughness under a larger amount of Al$_2$O$_3$.

SUMMARY OF THE INVENTION

Therefore, a primary concern of the present invention is to provide a ZrO$_2$—Al$_2$O$_3$ composite ceramic material having increased wear resistance and hardness, while maintaining a good balance between mechanical strength and toughness, under a larger amount of Al$_2$O$_3$ than heretofore.

That is, the ZrO$_2$—Al$_2$O$_3$ composite ceramic material of the present invention comprises a ZrO$_2$ phase containing 10 to 12 mol % of CeO$_2$ as a stabilizer and composed of 90 vol % or more of tetragonal ZrO$_2$, and an Al$_2$O$_3$ phase. An amount of the Al$_2$O$_3$ phase in the composite ceramic material is in a range of 20 to 70 vol %, and preferably 40 to 70 vol %. Al$_2$O$_3$ grains each having a fine ZrO$_2$ grain therein are dispersed in the composite ceramic material. Some of the Al$_2$O$_3$ grains each having the fine ZrO$_2$ grain therein are trapped within ZrO$_2$ grains to form composite grains. A first dispersion ratio defined as a ratio of the number of the Al$_2$O$_3$ grains each having the fine ZrO$_2$ grain therein relative to the number of the entire Al$_2$O$_3$ grains dispersed in the composite ceramic material is 10% or more, preferably 30% or more, and more preferably 50% or more. A second dispersion ratio defined as a ratio of the number of the Al$_2$O$_3$ grains of the composite grains relative to the number of the entire Al$_2$O$_3$ grains dispersed in the composite ceramic material is 0.3% or more, preferably 1% or more, and more preferably 1.5% or more.

According to the present invention, the Al$_2$O$_3$ grains each having the fine ZrO$_2$ grain therein are dispersed at 10% or more of the first dispersion ratio in the ZrO$_2$—Al$_2$O$_3$ composite ceramic material. This is, by using a specific production method described later, an amount of so-called zirconia toughened alumina (ZTA) grains, which are formed by trapping fine tetragonal ZrO$_2$ grains within Al$_2$O$_3$ grains, can be remarkably increased. This brings about an increase in critical stress required for causing stress-induced phase transformation from the tetragonal ZrO$_2$ to the monoclinic ZrO$_2$. As a result, it is possible to reliably provide the composite ceramic material with excellent mechanical strength and toughness.

Without wishing to be bound by theory, it is presently believed that the remarkable improvement of mechanical properties in the present invention results from the following mechanism. As described above, the ZrO$_2$—Al$_2$O$_3$ composite ceramic material of the present invention is characterized in that the Al$_2$O$_3$ grains having the fine (tetragonal) ZrO$_2$ grains therein are dispersed at a high dispersion ration (first dispersion ratio) in the ZrO$_2$—Al$_2$O$_3$ composite ceramic material. Since the Al$_2$O$_3$ grains having the fine (tetragonal) ZrO$_2$ grains therein construct the zirconia toughened alumina (ZTA) grains, the toughness of the Al$_2$O$_3$ grain is remarkably improved by the presence of the fine ZrO$_2$ grain. Moreover, when such a toughness-improved $Al_2O_3$ grain is trapped within the (larger-sized) $ZrO_2$ grain, sub-grain boundaries are formed within the $ZrO_2$ grain. The formation of the sub-grain boundaries plays a role in dividing the (larger) $ZrO_2$ grain incorporating the toughness-improved $Al_2O_3$ grain therein into imaginary more finer sized grains.

Thus, by achieving a remarkably high dispersion ratio of the ZTA grains, i.e., 10% or more of the first dispersion ratio, it is possible to provide the $ZrO_2$—$Al_2O_3$ composite ceramic material having excellent wear resistance and hardness, while maintaining the good balance between mechanical strength and toughness, even under a larger amount of 40 to 70 vol % of the $Al_2O_3$ phase in the composite ceramic material.

In the above composite ceramic material, when $ZrO_2$ grains each having an $Al_2O_3$ grain therein are dispersed in the composite ceramic material, and a third dispersion ratio defined as a ratio of the number of the $Al_2O_3$ grains trapped within the $ZrO_2$ grains relative to the number of the entire $Al_2O_3$ grains dispersed in the composite ceramic material is 1.5% or more, it is preferred that the second dispersion ratio "R2" satisfies the following condition:

$$R2 \geq \alpha \times R3 \times R1/100$$

wherein "R1" is the first dispersion ratio, "R3" is the third dispersion ratio, and "α" is a coefficient determined within a range of 0.8 to 1 by taking account of measurement errors.

A further concern of the present invention is to provide a method of producing the $ZrO_2$—$Al_2O_3$ composite ceramic material described above. That is, this method comprises the steps of:
mixing a first powder for providing the $ZrO_2$ phase with a second powder for providing the $Al_2O_3$ phase such that an amount of the $Al_2O_3$ phase in the composite ceramic material is in a range of 20 to 70 vol %;
molding a resultant mixture in a desired shape to obtain 3 green compact; and sintering said green compact in an oxygen-containing atmosphere,
wherein the second powder has $Al_2O_3$ particles each having a fine $ZrO_2$ particle therein, and
a ratio of the number of the $Al_2CO_3$ particles each having the fine $ZrO_2$ particle therein in the second powder is 5% or more.

According to the production method of the present invention, a high dispersion ratio of the ZTA grains, i.e., 10% or more of the first dispersion ratio can be achieved by using the second powder with 5% or more of the $Al_2O_3$, particles each having a fine $ZrO_2$ particle therein, and trapping fine $ZrO_2$ grains within $Al_2O_3$ grains by help of grain growth during the sintering process.

As a preferred preparation process of the second powder in the above method, it comprises the step of adding a $ZrO_2$ powder to at least one selected from a θ-$Al_2O_3$ powder and a γ-$Al_2O_2$ powder having, a specific surface of 50 to 400 m²/g to obtain a mixed powder. In addition, it is preferred that the preparation process comprises the steps of adding a $ZrO_2$ powder to one of an aqueous solution of an aluminum salt and an organic solution of an aluminum alkoxide, hydrolyzing a resultant mixture to obtain a precipitate, and drying the precipitate. Alternatively, it is preferred that the preparation process comprises the steps of adding an aqueous solution of a zirconium salt to one of an aqueous solution of an aluminum salt and an organic solution of an aluminum alkoxide, hydrolyzing a resultant mixture to obtain a precipitate, and drying the precipitate. In theses preparation processes, it is preferred to calcine the mixed powder or the precipitate in an oxygen containing atmosphere it a temperature of 800° C. to 1300° C.

These and further purposes and advantages of the present invention will be clearly understood from the following detail explanation and examples of the invention.

BRIEF EXPLANATION OF THE DRAWING

The FIGURE is a SEM photograph showing a composite grain dispersed in a $ZrO_2$—$Al_2O_3$ composite ceramic material of the present invention.

DETAIL EXPLANATION OF THE INVENTION

The $ZrO_2$ phase of the $ZrO_2$—$Al_2O_3$ composite ceramic material of the present invention is composed of 90 vol % or more of tetragonal $ZrO_2$. To obtain such a large amount of tetragonal $ZrO_2$, the $ZrO_2$ phase contains 10 to 12 mol % of $CeO_2$ as a stabilizer. When the $CeO_2$ amount is less than 10 mol %, an amount of monoclinic $ZrO_2$ relatively increases, so that cracks may easily occurs in the composite ceramic material. On the other hand, when the $CeO_2$ amount exceeds 12 mol %, cubic $ZrO_2$ of a high-temperature stable phase begins to appear, so that there is a fear that the mechanical strength and toughness can not be sufficiently improved by the stress induced phase transformation of tetragonal $ZrO_2$ to monoclinic $ZrO_2$. Preferably, the zirconia phase is composed of 90 vol % or more of tetragonal $ZrO_2$ and the balance of monoclinic $ZrO_2$.

The composite ceramic material of the present invention is essential to contain 20 to 70 vol %, preferably 40 to 70 vol %, and more preferably more than 50% and less than 70% of the $Al_2O_3$ phase. When the $Al_2O_3$ amount is less than 20 vol %, the wear resistance and the mechanical strength of the composite ceramic material can not be sufficiently improved. On the other hand, when the $Al_2O_3$ amount exceeds 70 vol %, considerable reductions in mechanical strength and toughness occur. When the $Al_2O_3$ amount is in the range of 40 to 70 vol %, it is possible to provide a high-reliability ceramic material having good balance between the mechanical strength and toughness in a high level.

One of the important features of the composite ceramic material of the present invention is that $Al_2O_3$ grains each having a fine $ZrO_2$ grain therein are uniformly dispersed in the composite ceramic material at a much higher dispersion ratio than heretofore by using an $Al_2O_3$ powder containing a composite powder in a production method described below for the composite ceramic material of the present invention. In this regard, the composite powder is composed of $Al_2O_3$ particles each having a fine $ZrO_2$ particle therein. An amount used of the composite powder is determined such that a ratio of the number of the $Al_2O_3$ particles each having the fine $ZrO_2$ particle therein in the $Al_2O_3$ powder is 5% or more, preferably 20% or more, and more preferably 35% or more. In addition, a ratio of the number of the $Al_2O_3$ grains each having, the fine $ZrO_2$ grain therein relative to the number of the entire $Al_2O_3$ grains dispersed in the composite ceramic material is defined as a first dispersion ratio. In the present invention, the first dispersion ratio is 10% or more, preferably 30% or more, and more preferably 50% or more. A mechanism of improving mechanical properties of the composite ceramic material resulting from an increase in the first dispersion ratio of the $Al_2O_3$ grains each having the fine $ZrO_2$ grain therein in the composite ceramic material is explained later in detail.

The composite ceramic material of the present invention is also characterized in that composite grains, each of which has a structure that an $Al_2O_3$ grain having a fine (tetragonal) $ZrO_2$ grain therein is trapped within a (larger-sized) $ZrO_2$ grain, as shown in the FIGURE, are aggressively dispersed in the composite ceramic material. In the present specification, a ratio of the number of the $Al_2O_3$ grains of the composite grains relative to the number of the entire $Al_2O_3$ grains dispersed in the composite ceramic material is defined as a second dispersion ratio. The second dispersion ratio is 0.3% or more. When the second dispersion ratio is less than 0.3%, the formation amount of the zirconia toughened alumina (ZTA) in the composite ceramic material decreases, so that there is a fear that the effect of improving the mechanical strength and toughness is not sufficiently obtained as increasing, $Al_2O_3$ content. In other words, as the second dispersion ratio is 0.3% or more, preferably 1% or more, and more preferably 1.5% or more, higher improvements of both mechanical strength and toughness of the composite ceramic material can be achieved.

In addition, when $ZrO_2$ grains each having, an $Al_2O_3$ grain therein are dispersed in the composite ceramic material, a ratio of the number of $Al_2O_3$ grains trapped within $ZrO_2$ grains relative to the number of the entire $Al_2O_3$ grains dispersed in the composite ceramic material is defined as a third dispersion ratio. In the present invention, it is preferred that the third dispersion ratio is 1.5% or more. When the third dispersion ratio is less than 1.5%, an effect of dividing the $ZrO_2$ grains into more finer sized grains by the formation of sub-grain boundaries may become insufficient, so that a reduction in strength easily occurs as increasing $Al_2O_3$ content. An upper limit of the third dispersion ratio is not restricted. In a theoretical sense, as the third dispersion ratio increases, the mechanical properties of the composite ceramic material can be further improved. The number of $Al_2O_3$ grains each existing in the composite grain is included in the number of the $Al_2O_3$ grains dispersed in the $ZrO_2$ grains.

In the present invention, it is preferred that the second dispersion ratio "R2" satisfies the following condition:

$$R2 \geq \alpha \times R3 \times R1/100$$

wherein "R1" is the first dispersion ratio, "R3" is the third dispersion ratio, and "$\alpha$" is a coefficient determined within a range of 0.8 to 1 by taking account of measurement errors. Thus, the composite ceramic material of the present invention is further characterized in that the formation amount of the composite grains increases as the first dispersion ratio and/or the third dispersion ratio becomes larger.

The size of the fine $ZrO_2$ grain of the composite grain is not restricted on the assumption that the fine $ZrO_2$ grain can be trapped within the $Al_2O_3$ grain. For example, it is preferred that fine tetragonal $ZrO_2$ grains having an average grain size of several ten nanometers are trapped within the $Al_2O_3$ grains. The number of the fine $ZrO_2$ grains each trapped within the $Al_2O_3$ grain of the composite grain is included in the number of the $ZrO_2$ grains dispersed in the $Al_2O_3$ grains.

It is preferred that the $Al_2O_3$ grains of the composite ceramic material has an average grain size of 0.1 to 0.5 µm. When the average grain size exceeds 0.5 µm, it becomes difficult to disperse the $Al_2O_3$ grains within the $ZrO_2$ grains at the above third dispersion ratio. On the other hand, when the average grain size is less than 0.1 µm, it is difficult to obtain a highly dense sintered body of the composite ceramic material by pressureless sintering.

The size of the $ZrO_2$ grain of the composite grain is determined such that the $Al_2O_3$ grain having the fine $ZrO_2$ grain therein is trapped within the $ZrO_2$ grain. However, when the size of the $ZrO_2$ grain is excessively large, it may lead to a reduction in strength of the composite ceramic material. From this viewpoint, it is preferred that an average grain size of the $ZrO_2$ grains of the composite ceramic material is in a range of 0.1 to 1 µm. This average grain size is based on the $ZrO_2$ grains other than the fine $ZrO_2$ grains trapped within the $Al_2O_3$ grains. When the average grain size exceeds 1 µm, reductions in wear resistance and mechanical strength may occur. On the other hand, when the average grain size is less than 0.1 µm, it becomes difficult to obtain a highly dense sintered body of the composite ceramic material by pressureless sintering.

By the way, in the case of a conventional composite ceramic material with a simply mixed structure of $ZrO_2$ and $Al_2O_3$ grains having an average grain size of several micron levels, when the $Al_2O_3$ amount exceeds 30 vol %, the toughening mechanism based on the stress induced phase transformation of tetragonal $ZrO_2$ to monoclinic $ZrO_2$ is not a dominant factor of the composite ceramic material, so that there is a tendency that the mechanical strength and toughness gradually decrease. In addition, when the $Al_2O_3$ amount exceeds 50 vol %, it means that the matrix phase of the composite ceramic material is provided by the $Al_2O_3$ phase. This leads to a considerable deterioration of the mechanical properties of the conventional composite ceramic material.

However, according to the $ZrO_2$—$Al_2O_3$ composite ceramic material of the present invention, the fine $ZrO_2$ grains each trapped within the $Al_2O_3$ grain and the $Al_2O_3$ grains each trapped within the $ZrO_2$ grain contribute to promote piling up dislocations and form the sub-grain boundaries within the crystal grains, so that the wear resistance and mechanical strength of the composite ceramic material can be remarkably improved. In particular, when the $Al_2O_3$ amount is in the range of 40 to 70 vol %, fine tetragonal $ZrO_2$ grains are uniformly dispersed in the $Al_2O_3$ grains to form the zirconia toughened alumina (ZTA) structure, so that the $Al_2O_3$ grains are remarkably reinforced. In other words, even when the $Al_2O_3$ amount exceeds 50 vol %, high mechanical strength and toughness can be maintained by the formation of a fine crystal-grain structure effectively reinforced by the tetragonal $ZrO_2$ grains. From these reasons, the $ZrO_2$—$Al_2O_3$ composite ceramic material of the present invention obtained under the $Al_2O_3$ content larger than 50 vol % where the matrix phase is the $Al_2O_3$ phase exhibits excellent mechanical strength and toughness substantially comparable to the former $ZrO_2$—$Al_2O_3$ ceramic material where the matrix phase is the $ZrO_2$ phase.

Without wishing to be bound by theory, it is presently believed that the mechanical properties of the composite ceramic material of the present invention are improved by the following mechanism. That is, when the composite grains are dispersed in the composite ceramic material, each of which has the structure that the $Al_2O_3$ grain containing the fine tetragonal $ZrO_2$ grain therein is trapped within the tetragonal $ZrO_2$ grain, a residual stress field is locally generated around each of the fine tetragonal $ZrO_2$ grains within the $Al_2O_3$ grains and around each of the $Al_2O_3$ grains within the tetragonal $ZrO_2$ grains by a difference in thermal expansion coefficient between $Al_2O_3$ and $ZrO_2$ during a cooling procedure after sintering. By the influence of the residual stress field, lots of dislocations easily occur within the respective crystal grains. The dislocations are then piled up with each other, and finally the sub-grain boundaries are formed within the $Al_2O_3$ and $ZrO_2$ grains, respectively. The sub-grain boundaries provide the finer-grained structure, which has the capability of increasing a critical stress required for causing the stress-induced phase transformation from the tetragonal $ZrO_2$ to the monoclinic $ZrO_2$. As a result, the composite ceramic material of the present invention demonstrates excellent wear resistance and hardness as well as high mechanical strength and toughness.

Referring to the SEM photograph of the FIGURE, the structure of the composite ceramic material of the present invention is more concretely explained. This SEM photograph shows that the above-described composite grain exists in a uniformly mixed structure of normal tetragonal $ZrO_2$ grains not having $Al_2O_3$ grains therein, and normal $\alpha$-$Al_2O_3$ grains not having $ZrO_2$ grains therein. In addition, it shows that an $Al_2O_3$ grain containing a fine $ZrO_2$ grain therein and $Al_2O_3$ grains not containing the fine $ZrO_2$ grain therein are dispersed within the large $ZrO_2$ grain constructing this composite grain. Moreover, it shows that an $Al_2O_3$ grain containing a fine $ZrO_2$ grain therein other than the composite grain exists in the composite ceramic material. The number of fine $ZrO_2$ grains in the single $Al_2O_3$ grain and the number of $Al_2O_3$ grains in the single $ZrO_2$ grain are not restricted. For example, a plurality of fine $ZrO_2$ grains may be trapped in the single $Al_2O_3$ grain, or a plurality of $Al_2O_3$ grains may be trapped in the single $ZrO_2$ grain.

As a preferred embodiment of the present invention, the zirconia phase may contain another stabilizer such as MgO, CaO, $TiO_2$ and/or $Y_2O_3$ in addition to $CeO_2$. For example, it is preferred to use 0.01 to 1 mol % of $TiO_2$ and/or 0.01 to 0.5 mol % of CaO with respect to the total amount of the zirconia phase in addition to 10 to 12 mol % of $CeO_2$. In this case, the grain growth of the zirconia phase is enhanced to a moderate degree by the addition of $TiO_2$, so that $Al_2O_3$ grains can be easily dispersed within the $ZrO_2$ grains. In addition, it is possible to increase a critical stress of the stress induced phase transformation. When the additive amount of $TiO_2$ is less than 0.01 mol %, the effect of enhancing the grain growth of the zirconia phase may be not obtained sufficiently. On the other hand, when the additive amount of $TiO_2$ exceeds 1 mol %, abnormal grain growth of the zirconia phase easily occurs, so that the mechanical strength and the wear resistance of the composite ceramic material may deteriorate.

On the other hand, the addition of CaO prevents the abnormal grain growth of the zirconia phase to improve the balance between the mechanical strength and toughness. In particular, it is effective to obtain the composite ceramic material having excellent wear resistance and mechanical strength. When the additive amount of CaO is less than 0.01 mol %, the effect of preventing the abnormal grain growth of the zirconia phase may be not obtained sufficiently. On the other hand, when the additive amount of CaO exceeds 0.5 mol %, cubic zirconia beings to appear in the zirconia phase, so that it becomes difficult to obtain the zirconia phase composed of 90 vol % or more of tetragonal $ZrO_2$. The generation of cubic zirconia easily leads to an increase in average grain size of the zirconia phase. In such a case, deterioration in mechanical strength, toughness and wear resistance may occur. The zirconia phase may contain a small amount of impurities. For example, it is desired that the amount of the impurities is 0.5 mol % or less with respect to the total amount of the zirconia phase.

The composite ceramic material of the present invention is preferably used in applications requiring excellent wear resistance expected by increasing the $Al_2O_3$ content, while maintaining mechanical strength and toughness substantially equal to the previous $ZrO_2$—$Al_2O_3$ ceramic materials. For example, it is preferred to use the composite ceramic material of the present invention for an artificial joint described in the international patent application WO02/11780. That is, when a joint portion of the artificial joint is provided by a sliding contact between the composite ceramic material and polyethylene, it is possible to reduce a wear amount of polyethylene. In addition, when the joint portion of the artificial joint is formed by a sliding contact between the composite ceramic materials, particularly improved wear resistance can be achieved. Thus, by use of the composite ceramic material of the present invention, it is possible to obtain the artificial joint having the capability of stably providing a smooth joint motion for an extended time period under severe conditions in a living body.

Next, a method of producing the $ZrO_2$—$Al_2O_3$ composite ceramic material of the present invention is explained. The production method comprises the steps of mixing a first power for providing the $ZrO_2$ phase with a second powder for providing the $Al_2O_3$ phase such that an amount of the $Al_2O_3$ phase in the composite ceramic material is in a range of 20 to 70 vol %, molding a resultant mixture in a desired shape to obtain a green compact, and sintering the green compact at a sintering temperature in an oxygen-containing atmosphere. The production method of the present invention is characterized in that the second powder contains the composite powder described above, which is composed of the $Al_2O_3$ particles each having the fine $ZrO_2$ particle therein, and a ratio of the number of the $Al_2O_3$ particles each having the fine $ZrO_2$ particle therein in the second powder is 5% or more.

To obtain the $ZrO_2$ phase composed of 90 vol % or more of tetragonal $ZrO_2$, the first powder is prepared such that the $ZrO_2$ phase contains 10 to 12 mol % of $CeO_2$ as a stabilizer. In addition, as the first powder, it is preferred to use a tetragonal $ZrO_2$ powder containing a required amount of $TiO_2$ and/or CaO in addition to $CeO_2$. A preparation process of the first powder is not restricted. For example, the following process is recommended.

That is, a cerium containing compound such as cerium salts is added to an aqueous solution of a zirconium salt. If necessary, an aqueous solution of a titanium salt and/or a calcium salt, or an organic solution of a titanium or calcium alkoxide as a titanium containing compound or a calcium containing compound may be added. Then, hydrolysis is performed by adding an alkali aqueous solution such as aqueous ammonia to a resultant mixture to obtain a precipitate. The precipitate is dried, calcined in the oxygen-containing atmosphere, e.g., in the air, and then pulverized by means of wet ball milling to obtain the tetragonal $ZrO_2$ powder having a desired particle distribution.

In the case of using the tetragonal $ZrO_2$ powder, it is preferred that the $ZrO_2$ powder has a specific surface area of 10 to 20 $m^2/g$ to obtain the green compact of a sufficient green density. Such a green compact can be easily sintered by pressureless sintering. When the specific surface area is less than 10 $m^2/g$, it becomes difficult to obtain the $ZrO_2$ phase having an average grain size of 1 μm or less after sintering. On the other hand, when the specific surface area exceeds 20 $m^2/g$, the bulk density considerably decreases, so that handling of the first powder becomes difficult. As a result, there is a fear that the green compact cannot be densely sintered by pressureless sintering.

In the present invention, to uniformly disperse the composite grains in the composite ceramic material, the second powder contains at least 5% of the composite powder composed of the $Al_2O_3$ particles each having the fine $ZrO_2$ particle therein. For example, a required amount of the first powder is mixed with an $Al_2O_3$ powder to obtain a mixed powder, and then a resultant mixed powder is calcined in an oxygen containing atmosphere at a temperature of 800° C. to 1300° C., and preferably 1000° C. to 1200° C. to obtain the second powder containing the composite powder. In this case, it is preferred that the $Al_2O_3$ powder is at least one selected from a $\theta$-$Al_2O_3$ powder and a $\gamma$-$Al_2O_3$ powder having a specific surface area of 50 to 400 $m^2/g$. The specific surface area of this $Al_2O_3$ powder is much greater than the specific surface of the first powder. In other words, since the $Al_2O_3$ powder used to prepare the composite powder is much finer than the first powder, the above-described mixed powder comprises $ZrO_2$ particles surrounded with ultra-fine $Al_2O_3$ particles.

Next, a phase transformation of $\theta$-$Al_2O_3$ and/or $\gamma$-$Al_2O_3$ of the mixed powder to $\alpha$-$Al_2O_3$ occurs during the calcining procedure. At this time, the $ZrO_2$ particles in the mixed powder are trapped within $\alpha$-$Al_2O_3$ particles each having an increased particle size caused by the phase transformation. The thus obtained composite powder is excellent in moldability as compared with the case of using the $\theta$-$Al_2O_3$ or $\gamma$-$Al_2O_3$ powder. In addition, there is an advantage that the average grain size of the $Al_2O_3$ particle dispersed in the composite ceramic material can be easily controlled in the range of 0.1 to 0.5 μm.

It is preferred that the composite powder obtained by the above preparation process is mainly composed of $\alpha$-$Al_2O_3$ particles having an average grain size of 0.3 μm or less, each of which has the fine $ZrO_2$ particle therein. However, an amount of $\alpha$-$Al_2O_3$ in the composite powder is not restricted. That is, it is enough that a part of $\theta$-$Al_2O_3$ and/or $\gamma$-$Al_2O_3$ is transformed to $\alpha$-$Al_2O_3$ by the calcining procedure, and allowed to be mixed condition of $\theta$-$Al_2O_3$ and/or $\gamma$-$Al_2O_3$ and $\alpha$-$Al_2O_3$. In the present invention, the ratio of the number of the $Al_2O_3$ particles of the each having the fine $ZrO_2$ particle therein in the second powder is 5% or more, preferably 25% or more, and more preferably 35% or more.

As another preferred process of preparing the second powder, a $ZrO_2$ powder is added to an aqueous solution of an aluminum salt or an organic solution of an aluminum alkoxide. A resultant mixture is hydrolyzed to obtain a precipitate, and then the precipitate is dried. The dried precipitate is calcined in an oxygen containing atmosphere at a temperature of from 800° C. to 1300° C., and then pulverized by means of wet ball milling to obtain the second powder having a desired particle distribution. In the above method, an aqueous solution of a zirconium salt may be used in stead of the $ZrO_2$ powder.

In the case of preparing the composite powder as the second powder, a mixing ratio of $Al_2O_3$ and $ZrO_2$ is not restricted. To efficiently obtain the $\alpha$-$Al_2O_3$ particles each containing a fine $ZrO_2$ particle therein, it is preferred that a volume ratio of $Al_2O_3$:$ZrO_2$ in the composite powder is in a range of 95:5 to 50:50. When the value of $ZrO_2$ in this volume ratio is less than 5, it is difficult to obtain sufficient amounts of the $\alpha$-$Al_2O_3$ particles each containing a fine $ZrO_2$ particle therein by the calcining procedure. Consequently, the formation amount of the composite grains in the composite ceramic material decreases. On the other hand, when the value of $ZrO_2$ in this volume ratio is more than 50, an agglomeration of the $ZrO_2$ particles may occur. When the above volume ratio is within the range of 90:10 to 60:40, it is possible to more efficiently obtain the $\alpha$-$Al_2O_3$ particles each containing a fine $ZrO_2$ particle therein, thereby providing a high-quality composite powder suitable for producing the composite ceramic material of the present invention.

If necessary, a HIP treatment may be performed in an oxygen-containing atmosphere after sintering. To obtain effects of the HIP treatment at the maximum, it is preferred that the sintered body of the composite ceramic material obtained by the pressureless sintering has a relative density of 95% or more. A concentration of oxygen in the oxygen-containing atmosphere is not restricted. A mixture gas of oxygen and an inert gas such as argon may be used. In this case, it is preferred that the concentration of oxygen is approximately 5 vol % or more with respect to a total volume of the mixture gas.

EXAMPLES

The present invention is concretely explained below according to preferred examples. These Examples are illustrative only, and therefore the present invention is not limited to them.

Examples 1 to 6 and Comparative Examples 1 to 3

A $ZrO_2$—$Al_2O_3$ composite ceramic material of each of Examples 1 to 6 and Comparative Examples 1 to 3 was produced by the following method. That is, as a first powder for providing a $ZrO_2$ phase of the composite ceramic material, a tetragonal $ZrO_2$ powder having a specific surface area of 15 $m^2/g$ and containing 11 mol % of $CeO_2$, 0.05 mol % of $TiO_2$, and 0.16 mol % of CaO was used. On the other hand, a second powder for providing an $Al_2O_3$ phase of the composite ceramic material was prepared by using a $\gamma$-$Al_2O_3$ powder having a specific surface area of 300 $m^2/g$ and a part of the tetragonal $ZrO_2$ powder. A mixture ratio by volume of the $\gamma$-$Al_2O_3$ powder and the tetragonal $ZrO_2$ powder is 70:30.

That is, required amounts of the $\gamma$-$Al_2O_3$ powder and the tetragonal $ZrO_2$ powder were ball-milled in an ethanol solvent for 24 hours, and then dried to obtain a mixed powder. Subsequently, the mixed powder was calcined at 1000° C. in the air for 2 hours. The thus obtained calcined powder was further ball-milled in an ethanol solvent for 24 hours, and then dried to obtain an $Al_2O_3$ powder containing a composite powder (i.e., $Al_2O_3$ particles each having a $ZrO_2$ particle therein) as the second powder for providing the $Al_2O_3$ phase. From SEM observation, a ratio of the composite powder in the thus obtained $Al_2O_3$ powder, i.e., a ratio of the number of the $Al_2O_3$ particles each having a $ZrO_2$ particle therein relative to the entire $Al_2O_3$ particles of the thus obtained $Al_2O_3$ powder is about 28.3%.

The remaining tetragonal $ZrO_2$ powder was mixed with the $Al_2O_3$ powder containing the composite powder such that an $Al_2O_3$ amount in the composite ceramic material is in a range of 10 to 80 vol %, as listed in Table 1. A resultant mixture was ball-milled in an ethanol solvent for 24 hours, and then dried to obtain a powder for sintering. In Comparative Example 1, the $Al_2O_3$ content is zero.

TABLE 1

|  | $ZrO_2$ phase (mol %) | | | $Al_2O_3$ phase (vol %) | Average Grain Size (μm) | |
| --- | --- | --- | --- | --- | --- | --- |
|  | $CeO_2$ | $TiO_2$ | CaO |  | $ZrO_2$ | $Al_2O_3$ |
| Comparative Example 1 | 11 | 0.05 | 0.16 | 0 | 2.50 | — |
| Comparative Example 2 | 11 | 0.05 | 0.16 | 10 | 1.35 | 0.23 |
| Example 1 | 11 | 0.05 | 0.16 | 20 | 0.43 | 0.24 |
| Example 2 | 11 | 0.05 | 0.16 | 30 | 0.23 | 0.26 |
| Example 3 | 11 | 0.05 | 0.16 | 40 | 0.21 | 0.27 |
| Example 4 | 11 | 0.05 | 0.16 | 50 | 0.19 | 0.27 |
| Example 5 | 11 | 0.05 | 0.16 | 60 | 0.18 | 0.28 |
| Example 6 | 11 | 0.05 | 0.16 | 70 | 0.17 | 0.29 |
| Comparative Example 3 | 11 | 0.05 | 0.16 | 80 | 0.16 | 0.30 |

The thus obtained powder for sintering was molded at the pressure of 10 MPa by uniaxial pressing to obtain a disk-shaped green compact having a diameter of about 68 mm. After a CIP (cold isostatic pressing) treatment was performed to the green compact at the pressure of 147 MPa, the green compact was sintered at the sintering temperature of 1440° C. for 3 hours in the air by pressureless sintering to obtain a sintering body.

With respect to each of Examples 1 to 6 and Comparative Examples 1 to 3, the sintered body has a relative density of more than 99%. By X-ray diffraction analysis, it was confirmed that the $ZrO_2$ phase of the respective sintered body is composed of 90 vol % or more of tetragonal $ZrO_2$ and the balance of monoclinic $ZrO_2$. In addition, from SEM (scanning electron microscope) and TEM (transmission electron microscope) observations, it was confirmed that $Al_2O_3$ grains each having a fine $ZrO_2$ grain therein are dispersed in the sintered body of each of Examples 1 to 6 and Comparative Examples 2 and 3, and some of the $Al_2O_3$ grains each having the fine $ZrO_2$ grain therein are trapped within $ZrO_2$ grains to form composite grains.

In addition, a first dispersion ratio (W1), which is defined as a ratio of the number of the $Al_2O_3$ grains each having the fine $ZrO_2$ grain therein relative to the number of the entire $Al_2O_3$ grains dispersed in the composite ceramic material, a second dispersion ratio (W2), which is defined as a ratio of the number of $Al_2O_3$ grains of the composite grains relative to the number of the entire $Al_2O_3$ grains dispersed in the composite ceramic material, and a third dispersion ratio (W3), which is defined as a ratio of the number of the $Al_2O_3$ grains trapped within the $ZrO_2$ grains relative to the number of the entire $Al_2O_3$ grains dispersed in the composite ceramic material, are listed in Table 2.

The first to third dispersion ratios (W1, W2, W3) were determined by the following method. First, a sample for observation was prepared by polishing the sintered body and performing a heat treatment to the polished surface. Then, the SEM observation of the sample or the TEM observation of the sintered body was performed to count the number (S1) of entire $Al_2O_3$ grains existing within a view field (e.g., it is preferred to select an appropriate observation magnification such that at least 1000 grains exist in the view field), the number (n1) of $Al_2O_3$ grains each having the fine $ZrO_2$ grain therein in the same view field, the number (n2) of $Al_2O_3$ grains of the composite grains in the same view field, and the number (n3) of $Al_2O_3$ grains trapped within the $ZrO_2$ grains in the same view field. By substituting these numbers to the following equations, the first to third dispersion ratios were calculated. Results are shown in Tables 2.

$$W1[\%]=(n1/S1)\times 100$$

$$W2[\%]=(n2/S1)\times 100$$

$$W3[\%]=(n3/S1)\times 100$$

In addition, with respect to each of Examples 1 to 6 and Comparative Examples 1 to 3, average grain sizes of $ZrO_2$ grains and $Al_2O_3$ grains of the sintered body were measured by the TEM/SEM observation. To evaluate mechanical properties of the composite ceramic material, test specimens having the dimensions of 4 mm×3 mm×40 mm were prepared from the sintered body, and then 3-point bending strength and fracture toughness were measured at room temperature. The fracture toughness was measured by the IF method. Results are listed in Tables 1 and 2.

Moreover, to evaluate wear resistance of the composite ceramic material, a pin-on-disc test was performed in the presence of distilled water as a lubricant. The pin and the disc are made of the same composite ceramic material. The pin is provided with a cylinder solid having a diameter of 5 min and a length of 15 mm, and a circular cone having an apical angle of 30° and formed on a top of the cylinder solid. The top end of the circular cone has a flat mirror area with a diameter of 1.5 mm, which is used as a sliding surface. A surface roughness of this sliding surface is smaller than 0.005 μm Ra.

On the other hand, the disc has a diameter of 50 mm and a thickness of 8 mm. A sliding surface of the disc to be made contact with the pin is a mirror polished surface having a surface roughness smaller than 0.005 μm Ra. After the pin was placed on a circumference having a radius of 22 mm from the disc center on the disc, the pin-on-disc test was performed at a disc rotational speed of 60 mm/sec. A load applied to the pin is 60N, and a sliding distance is constant (25 km). Since the diameter of the top end of the pin is 1.5 mm, an initial friction pressure on the top end of the pin is 33 MPa. The pin-on-disc test was repeated three times under the same condition. An average value of the tests was adopted as data.

A reduction in weight of the pin was measured after the test, and a wear factor (Wf) was calculated by the following equation.

$$Wf=(W1-W2)/P\cdot L\cdot \rho$$

Where,
Wf: wear factor (mm3/Nm)
W1: dry weight (g) of pin before test
W2: dry weight (g) of pin after test
P: load (N)
L: sliding distance (m)
ρ: density (g/mm3) of test specimen

TABLE 2

| | Bending Strength (MPa) | Fracture Toughness (MPa·m$^{1/2}$) | Vickers Hardness (GPa) | Wear factor (mm³/Nm × 10$^{-7}$) | First Dispersion Ratio W1 (%) | Second Dispersion Ratio W2 (%) | Third Dispersion Ratio W3 (%) |
|---|---|---|---|---|---|---|---|
| Comparative Example 1 | 750 | 18.0 | 8.5 | 230 | — | — | — |
| Comparative Example 2 | 1080 | 17.2 | 9.7 | 48.2 | 40.0 | 1.4 | 3.5 |
| Example 1 | 1260 | 16.7 | 10.8 | 0.135 | 41.2 | 1.4 | 3.4 |
| Example 2 | 1380 | 15.8 | 12.0 | 0.048 | 39.4 | 1.3 | 3.3 |
| Example 3 | 1430 | 14.5 | 13.1 | 0.036 | 38.7 | 1.2 | 3.1 |
| Example 4 | 1410 | 13.2 | 14.3 | 0.028 | 39.3 | 1.1 | 2.8 |
| Example 5 | 1340 | 11.8 | 15.4 | 0.051 | 39.1 | 0.9 | 2.3 |
| Example 6 | 1220 | 10.2 | 16.6 | 0.074 | 41.2 | 0.7 | 1.7 |
| Comparative Example 3 | 900 | 7.9 | 17.7 | 2.65 | 44.4 | 0.4 | 0.9 |

In addition, Vickers hardness of the composite ceramic material was measured. Measurement results of the wear factor and the hardness are shown in Table 2.

As understood from results of Tables 1 and 2, the sintered bodies of Examples 1 to 6 containing 20 to 70 vol % of $Al_2O_3$ have the first dispersion ratio (W1) greater than 39%, the second dispersion ration (W2) greater than 0.5%, and the third dispersion ratio (W3) greater than 1.5%. In addition, these sintered bodies demonstrate excellent mechanical properties of a bending strength greater than 1200 MPa and a fracture toughness higher than $10.0 \text{ MPa·m}^{1/2}$.

On the other hand, since the sintered body of Comparative Example 1 does not contain the $Al_2O_3$ phase, it has excellent fracture toughness. However, the bending strength of the sintered body is considerably low. In the sintered body of Comparative Example 2, excellent fracture toughness is obtained, and the first to third dispersion ratios comparable to them of the sintered body of Example 1. However, the average grain size (=1.35 μm) of the $ZrO_2$ grains of Comparative Example 2 is much greater than the average grain size (=0.43 μm) of the $ZrO_2$ grains of Example 1. This suggests that the grain growth of the $ZrO_2$ grains can not be sufficiently inhibited by using such a small amount of $Al_2O_3$. As a result, the sintered body of Comparative Example 2 has a relatively low mechanical strength, and a tendency of increasing variations in mechanical properties. Thus, it is difficult to provide the composite ceramic material that is excellent in both of strength and toughness. With respect to the sintered body of Comparative Example 3, since the excessive amount of $Al_2O_3$ was used, both of strength and toughness considerably lowered. In addition, the number of the $Al_2O_3$ grains trapped within the $ZrO_2$ grains, i.e., the third dispersion ratio (W3) is extremely low. This suggests that the composite grains can not be efficiently dispersed in the composite ceramic material in the case of using such a large amount of $Al_2O_3$.

As described above, the concern of the present invention is to provide the ceramic material having excellent wear resistance and hardness, while maintaining high strength and toughness under the larger amount of $Al_2O_3$ than heretofore. The results of Table 2 show that both of wear resistance and hardness can be highly improved when the $Al_2O_3$ content is in the range of 20 to 70 vol %. On the contrary, the sintered body of Comparative Example 2 shows a deterioration in wear resistance due to the deficiency of $Al_2O_3$ and the increase in average grain size of the $ZrO_2$ grains. In addition, the sintered body of Comparative Example 3 shows poor mechanical strength and toughness as well as the deterioration in wear resistance due to the excessive amount of $Al_2O_3$ in the composite ceramic material.

Examples 7 to 21

A $ZrO_2$—$Al_2O_3$ composite ceramic materials of each of Examples 7 to 21 was produced by the following method. That is, as listed in table 3, a tetragonal $ZrO_2$ powder having a specific surface area of 15 $m^2/g$ and containing a $CeO_2$ amount of 10 to 12 mol % or containing the $CeO_2$ amount of 10 to 12 mol %, $TiO_2$ amount of 0.02 to 1 mol %, and a CaO amount of 0.02 to 0.5 mol % was used as a first powder for providing a $ZrO_2$ phase of the composite ceramic material.

TABLE 3

| | $ZrO_2$ phase (mol %) | | | $Al_2O_3$ phase | Average Grain Size (μm) | |
|---|---|---|---|---|---|---|
| | $CeO_2$ | $TiO_2$ | CaO | (vol %) | $ZrO_2$ | $Al_2O_3$ |
| Example 7 | 10 | 0.00 | 0.00 | 40 | 0.21 | 0.20 |
| Example 8 | 10 | 0.05 | 0.03 | 40 | 0.24 | 0.22 |
| Example 9 | 10 | 0.30 | 0.15 | 40 | 0.33 | 0.25 |
| Example 10 | 10 | 0.70 | 0.35 | 40 | 0.45 | 0.28 |
| Example 11 | 10 | 1.00 | 0.50 | 40 | 0.50 | 0.30 |
| Example 12 | 11 | 0 | 0 | 40 | 0.21 | 0.20 |
| Example 13 | 11 | 0.03 | 0.02 | 40 | 0.23 | 0.21 |
| Example 14 | 11 | 0.20 | 0.10 | 40 | 0.29 | 0.24 |
| Example 15 | 11 | 0.60 | 0.30 | 40 | 0.43 | 0.28 |
| Example 16 | 11 | 0.90 | 0.45 | 40 | 0.48 | 0.29 |
| Example 17 | 12 | 0 | 0 | 40 | 0.21 | 0.20 |
| Example 18 | 12 | 0.02 | 0.01 | 40 | 0.22 | 0.21 |
| Example 19 | 12 | 0.10 | 0.05 | 40 | 0.26 | 0.23 |
| Example 20 | 12 | 0.50 | 0.25 | 40 | 0.40 | 0.27 |
| Example 21 | 12 | 0.80 | 0.40 | 40 | 0.47 | 0.29 |

On the other hand, a second powder for providing an $Al_2O_3$ phase of the composite ceramic material was prepared by the following process. That is, a part of the above-described tetragonal $ZrO_2$ powder was added to a hydrochloric acid solution of aluminum chloride ($AlCl_3$) such that a mixture ratio by volume of $Al_2O_3$:$ZrO_2$ is 70:30. Next, an aqueous solution of sodium hydroxide was added to a resultant mixed solution, and hydrolyzed to obtain a precipitate. The precipitate was washed with water, and then dried. Next, the dried precipitate was calcined at 1000° C. in the air for 2 hours. The thus obtained calcined powder was ball-milled in an ethanol solvent for 24 hours, and then dried to obtain an $Al_2O_3$ powder containing a composite powder. From SEM observation, a ratio of the composite powder in the thus obtained $Al_2O_3$ powder, i.e., a ratio of the number of the $Al_2O_3$ particles each having a $ZrO_2$ particle therein relative to the entire $Al_2O_3$ particles of the thus obtained $Al_2O_3$ powder is about 39.8%.

The remaining tetragonal $ZrO_2$ powder was mixed with the $Al_2O_3$ powder containing the composite powder such that an $Al_2O_3$ amount in the composite ceramic material is 40 vol %. A resultant mixture was ball-milled in an ethanol solvent for 24 hours, and then dried to obtain a powder for sintering. The powder for sintering was molded into a required shape by uniaxial pressing, and then sintered by pressureless sintering to obtain a sintered body, as in the case of Example 1.

With respect to each of Examples 7 to 21, the sintered body has a relative density of more than 99%. By X-ray diffraction analysis, it was confirmed that the $ZrO_2$ phase of the respective sintered body is composed of 90 vol % or more of tetragonal $ZrO_2$ and the balance of monoclinic $ZrO_2$. In addition, from SEM and TEM observations, it was confirmed that $Al_2O_3$ grains each having a fine $ZrO_2$ grain therein are dispersed in the sintered body of each of Examples 7 to 21, and some of the $Al_2O_3$ grains each having the fine $ZrO_2$ grain therein are trapped within $ZrO_2$ grains to form composite grains. In addition, according to the same method as Example 1, the first to third dispersion ratios were determined with respect to each of Examples 7 to 21. Results are shown in Table 4.

TABLE 4

|  | Bending Strength (MPa) | Fracture Toughness (MPa·m$^{1/2}$) | First Dispersion Ratio W1 (%) | Second Dispersion Ratio W2 (%) | Third Dispersion Ratio W3 (%) |
|---|---|---|---|---|---|
| Example 7 | 1100 | 18.0 | 56.5 | 1.3 | 2.3 |
| Example 8 | 1350 | 17.6 | 57.1 | 1.6 | 2.8 |
| Example 9 | 1260 | 17.4 | 56.7 | 1.7 | 3.0 |
| Example 10 | 1240 | 17.2 | 58.1 | 1.8 | 3.1 |
| Example 11 | 1210 | 17.1 | 57.6 | 1.9 | 3.3 |
| Example 12 | 1220 | 14.8 | 56.5 | 1.3 | 2.3 |
| Example 13 | 1420 | 14.5 | 57.1 | 1.6 | 2.8 |
| Example 14 | 1410 | 14.3 | 55.2 | 1.6 | 2.9 |
| Example 15 | 1310 | 14.1 | 56.7 | 1.7 | 3.0 |
| Example 16 | 1290 | 14.0 | 56.3 | 1.8 | 3.2 |
| Example 17 | 1410 | 11.0 | 56.5 | 1.3 | 2.3 |
| Example 18 | 1570 | 10.7 | 57.1 | 1.6 | 2.8 |
| Example 19 | 1540 | 10.6 | 58.6 | 1.7 | 2.9 |
| Example 20 | 1380 | 10.5 | 56.7 | 1.7 | 3.0 |
| Example 21 | 1360 | 10.4 | 56.3 | 1.8 | 3.2 |

In addition, with respect to each of Examples 7 to 21, average grain sizes of the $ZrO_2$ grains and the $Al_2O_3$ grains of the sintered body were measured by the SEM/TEM observation. The average grain size of the $ZrO_2$ grains is in a range of 0.2 to 0.5 and the average grain size of the $Al_2O_3$ grains is 0.3 μm or less. To evaluate mechanical properties of the composite ceramic material, test specimens having dimensions of 4 mm×3 mm×40 mm were prepared from the sintered body, and 3-point bending strength and fracture toughness were measured at room temperature. The fracture toughness was measured by the IF method. Results are shown in Tables 3 and 4.

The results of Tables 3 and 4 suggest that the bending strength can be further improved by using slight amounts of $TiO_2$ and CaO in addition to $CeO_2$ as the stabilizer, without deteriorating the fracture toughness.

Examples 22 to 27

A $ZrO_2$—$Al_2O_3$ composite ceramic materials of each of Examples 22 to 27 was produced by the following method. That is, as a first powder for providing a $ZrO_2$ phase of the composite ceramic material, a tetragonal $ZrO_2$ powder having a specific surface of 15 m$^2$/g and containing 11 mol % of $CeO_2$, 0.05 mol % of $TiO_2$, and 0.13 mol % of CaO was used. On the other hand, a second powder for providing an $Al_2O_3$ phase of the composite ceramic material was prepared by using a θ-$Al_2O_3$ powder having a specific surface of 100 m$^2$/g and a part of the above-described tetragonal $ZrO_2$ powder. A mixture ratio by volume of the θ-$Al_2O_3$ powder and the tetragonal $ZrO_2$ powder was changed in a range of 95:5 to 50:50, as shown in Table 5.

TABLE 5

|  | $ZrO_2$ phase (mol %) | | | $Al_2O_3$ phase vol % | Composite | Average Grain Size (μm) | |
|---|---|---|---|---|---|---|---|
|  | $CeO_2$ | $TiO_2$ | CaO | ($Al_2O_3$:$ZrO_2$) | Powder Ratio (%) | $ZrO_2$ | $Al_2O_3$ |
| Example 22 | 11 | 0.05 | 0.13 | 50 (95:5) | 7.2 | 0.25 | 0.30 |
| Example 23 | 11 | 0.05 | 0.13 | 50 (90:10) | 14.0 | 0.23 | 0.28 |
| Example 24 | 11 | 0.05 | 0.13 | 50 (80:20) | 27.1 | 0.22 | 0.27 |
| Example 25 | 11 | 0.05 | 0.13 | 50 (70:30) | 39.4 | 0.21 | 0.26 |
| Example 26 | 11 | 0.05 | 0.13 | 50 (60:40) | 52.5 | 0.22 | 0.27 |
| Example 27 | 11 | 0.05 | 0.13 | 50 (50:50) | 63.2 | 0.23 | 0.28 |

TABLE 6

|  | Bending Strength (MPa) | Fracture Toughness (MPa·m$^{1/2}$) | First Dispersion Ratio W1 (%) | Second Dispersion Ratio W2 (%) | Third Dispersion Ratio W3 (%) |
|---|---|---|---|---|---|
| Example 22 | 1230 | 13.0 | 10.3 | 0.3 | 2.9 |
| Example 23 | 1340 | 13.1 | 20.0 | 0.6 | 3.0 |
| Example 24 | 1430 | 13.3 | 38.7 | 1.2 | 3.1 |
| Example 25 | 1460 | 13.3 | 56.3 | 1.8 | 3.2 |
| Example 26 | 1480 | 13.2 | 75.0 | 2.4 | 3.2 |
| Example 27 | 1500 | 13.1 | 90.3 | 2.8 | 3.1 |

That is, required amounts of the θ-$Al_2O_3$ powder and the above-described tetragonal $ZrO_2$ powder were ball-milled in an ethanol solvent for 24 hours, and then dried to obtain a mixed powder. Subsequently, the mixed powder was calcined at 1000° C. in the air for 2 hours. The thus obtained calcined powder was further ball-milled in an ethanol solvent for 24 hours, and then dried to obtain an $Al_2O_3$ powder containing a composite powder. From SEM observation, a ratio of the composite powder in the thus obtained $Al_2O_3$ powder, i.e., a ratio of the number of the $Al_2O_3$ particles each having a $ZrO_2$ particle therein relative to the entire $Al_2O_3$ particles of the thus obtained $Al_2O_3$ powder was estimated. Results are listed as "composite power ratio" in TABLE 5.

The remaining tetragonal $ZrO_2$ powder was mixed with the $Al_2O_3$ powder containing the composite powder such that an $Al_2O_3$ amount in the composite ceramic material is 50 vol %. A resultant mixture was ball-milled in an ethanol solvent for 24 hours, and the dried to obtain a powder for sintering. The powder for sintering was molded into a required shape by uniaxial pressing, and then sintered by pressureless sintering to obtain a sintered body, as in the case of Example 1.

With respect to each of Examples 22 to 27, the sintered body has a relative density of more than 99%. By X-ray diffraction analysis, it was confirmed that the $ZrO_2$ phase of the respective sintered body is composed of 90 vol % or more of tetragonal $ZrO_2$ and the balance of monoclinic $ZrO_2$. In addition, by SEM (scanning electron microscope) and TEM (transmission electron microscope) observations, it was confirmed that $Al_2O_3$ grains each having a fine $ZrO_2$ grain therein are dispersed in the sintered body of each of Examples 22 to 27, and some of the $Al_2O_3$ grains each having the fine $ZrO_2$ grain therein are trapped within $ZrO_2$ grains to form composite grains. In addition, according to the same method as Example 1, the first to third dispersion ratios were determined with respect to each of Examples 22 to 27. Results are shown in Table 6.

In addition, with respect to each of Examples 22 to 27, average grain sizes of $ZrO_2$ grains and $Al_2O_3$ grains of the sintered body were measured by the SEM/TEM observation. The average grain size of the $ZrO_2$ grains is in a range of 0.2 to 0.3 μm, and the average grain size of the $Al_2O_3$ grains is 0.3 μm or less. To evaluate mechanical properties of the composite ceramic material, test specimens having dimensions of 4 mm×3 mm×40 mm were prepared from the sintered body, and 3-point bending strength and fracture toughness were measured at room temperature. The fracture toughness was measured by the IF method. Results are shown in Tables 5 and 6.

The results of Tables 5 and 6 suggest that when the mixture ratio of $Al_2O_3$ and tetragonal $ZrO_2$ in the composite powder is in the range of 95:5 to 50:50, and particularly 90:10 to 60:40, the $ZrO_2$ grains can be efficiently trapped within the $Al_2O_3$ grains. Furthermore, by selecting an appropriate mixture ratio of $Al_2O_3$ and tetragonal $ZrO_2$ in the composite powder, it is possible to obtain the composite ceramic material having a further improved strength, while keeping the toughness constant.

Examples 28 to 32 and Comparative Examples 4 to 8

A $ZrO_2$—$Al_2O_3$ composite ceramic material of each of Examples 28 to 32 was produced by the following method. That is, as a first powder for providing a $ZrO_2$ phase of the composite ceramic material, a tetragonal $ZrO_2$ powder having a specific surface area of 15 m²/g and containing 11 mol % of $CeO_2$ and 0.02 mol % of $Y_2O_3$ was used. On the other hand, a second powder for providing an $Al_2O_3$ phase of the composite ceramic material was prepared by using a spherical γ-$Al_2O_3$ powder having a specific surface area of 100 m²/g and a part of the tetragonal $ZrO_2$ powder. A mixture ratio by volume of the γ-$Al_2O_3$ powder and the tetragonal $ZrO_2$ powder is 50:50.

That is, required amounts of the spherical γ-$Al_2O_3$ powder and the tetragonal $ZrO_2$ powder were ball-milled in an ethanol solvent for 24 hours, and then dried to obtain a mixed powder. Subsequently, the mixed powder was calcined at 1000° C. in the air for 2 hours. The thus obtained calcined powder was further ball-milled in an ethanol solvent for 24 hours, and then dried to obtain an $Al_2O_3$ powder containing a composite powder. From SEM observation, a ratio of the composite powder in the thus obtained $Al_2O_3$ powder, i.e., a ratio of the number of the $Al_2O_3$ particles each having a $ZrO_2$ particle therein relative to the entire $Al_2O_3$ particles of the thus obtained $Al_2O_3$ powder is about 62%.

The remaining tetragonal $ZrO_2$ powder was mixed with the $Al_2O_3$ powder containing the composite powder such that an $Al_2O_3$ amount in the composite ceramic material is in a range of 30 to 70 vol %, as listed in Table 7. A resultant mixture was ball-milled in an ethanol solvent for 24 hours, and then dried to obtain a powder for sintering.

TABLE 7

|  | $ZrO_2$ phase (mol %) | | $Al_2O_3$ phase | Average Grain Size (wm) | |
| --- | --- | --- | --- | --- | --- |
|  | $CeO_2$ | $Y_2O_3$ | (vol %) | $ZrO_2$ | $Al_2O_3$ |
| Example 28 | 11 | 0.02 | 30 | 0.22 | 0.25 |
| Example 29 | 11 | 0.02 | 40 | 0.20 | 0.26 |
| Example 30 | 11 | 0.02 | 50 | 0.18 | 0.26 |
| Example 31 | 11 | 0.02 | 60 | 0.17 | 0.27 |
| Example 32 | 11 | 0.02 | 70 | 0.16 | 0.28 |
| Comparative Example 4 | 11 | 0.02 | 80 | 0.15 | 0.29 |
| Comparative Example 5 | 11 | 0.02 | 40 | 0.23 | 0.30 |
| Comparative Example 6 | 11 | 0.02 | 50 | 0.21 | 0.30 |
| Comparative Example 7 | 11 | 0.02 | 60 | 0.20 | 0.33 |
| Comparative Example 8 | 11 | 0.02 | 70 | 0.19 | 0.38 |

The obtained powder for sintering was molded at the pressure of 10 MPa by uniaxial pressing to obtain a disk-shaped green compact having a diameter of about 68 mm. After a CIP (cold isostatic pressing) treatment was performed to the green compact at the pressure of 147 MPa, the green compact was sintered at the sintering temperature of 1440° C. for 3 hours in the air by pressureless sintering to obtain a sintering body.

On the other hand, a $ZrO_2$—$Al_2O_3$ composite ceramic material of Comparative Example 4 was produced by the same method as Examples 28 except that the composite powder was added such that the content of the $Al_2O_3$ phase in the composite ceramic material is 80 vol %. In addition, $ZrO_2$—$Al_2O_3$ composite ceramic materials of Comparative Examples 5 to 8 were produced by the same methods as Examples 29 to 32, respectively, except that a commercially available α-$Al_2O_3$ powder having an average particle size of 0.2 μm was used in place of the $Al_2O_3$ powder containing the composite powder.

With respect to each of Examples 28 to 32 and Comparative Examples 4 to 8, the sintered body has a relative density of more than 99%. By X-ray diffraction analysis, it was confirmed that the $ZrO_2$ phase of the respective sintered body is composed of 90 vol % or more of tetragonal $ZrO_2$ and the balance of monoclinic $ZrO_2$. In addition, from SEM (scanning electron microscope) and TEM (transmission electron microscope) observations, it was confirmed that $Al_2O_3$ grains each having a fine $ZrO_2$ grain therein are dispersed in the sintered body of each of Examples 28 to 32 and Comparative Example 4, and some of the $Al_2O_3$ grains each having the fine $ZrO_2$ grain therein are trapped within $ZrO_2$ grains to form composite grains. In addition, according to the same method as Example 1, the first to third dispersion ratios were determined with respect to each of Examples 28 to 32 and Comparative Examples 4 to 8. Results are shown in Table 8.

TABLE 8

|  | Bending Strength (MPa) | Fracture Toughness (MPa·m$^{1/2}$) | Vickers Hardness (GPa) | First Dispersion Ratio W1 (%) | Second Dispersion Ratio W2 (%) | Third Dispersion Ratio W3 (%) |
|---|---|---|---|---|---|---|
| Example 28 | 1480 | 16.8 | 12.6 | 89.0 | 3.0 | 3.4 |
| Example 29 | 1560 | 16.2 | 13.8 | 87.5 | 2.8 | 3.2 |
| Example 30 | 1580 | 15.5 | 15.0 | 88.8 | 2.6 | 2.9 |
| Example 31 | 1550 | 14.5 | 16.2 | 88.4 | 2.1 | 2.4 |
| Example 32 | 1430 | 12.8 | 17.4 | 89.3 | 1.6 | 1.8 |
| Comparative Example 4 | 1080 | 9.8 | 18.6 | 88.5 | 0.9 | 1.0 |
| Comparative Example 5 | 1050 | 5.7 | 12.9 | 3.6 | 0.0 | 3.1 |
| Comparative Example 6 | 970 | 5.3 | 14.1 | 3.1 | 0.0 | 2.8 |
| Comparative Example 7 | 880 | 4.9 | 15.2 | 2.6 | 0.0 | 2.3 |
| Comparative Example 8 | 780 | 4.5 | 16.3 | 2.0 | 0.0 | 1.7 |

As understood from results of Tables 7 and 8, the sintered bodies of Examples 28 to 32 containing 30 to 70 vol % of $Al_2O_3$ have the first dispersion ratio (W1) greater than 88%, the second dispersion ration (W2) greater than 1.5%, and the third dispersion ratio (W3) of 1.8% or more. In addition, these sintered bodies demonstrate excellent mechanical properties of a bending strength greater than 1400 MPa and a fracture toughness higher than 12 MPa·m$^{1/2}$.

On the other hand, in Comparative Example 4, the bending strength and the fracture toughness of the sintered body deteriorated due to the excessive amount (80 vol %) of the $Al_2O_3$ phase, despite an increase in the first dispersion ratio. In Comparative Examples 5 to 8, since the sintered bodies were produced without using the composite power, the first and second dispersion ratios considerably lowered, and deteriorations in bending strength and fracture toughness of the sintered body occurred. Thus, it becomes difficult to obtain the composite ceramic material having excellent bending strength and fracture toughness.

INDUSTRIAL APPLICABILITY

As understood from the above Examples, the $ZrO_2$—$Al_2O_3$ composite ceramic material of the present invention is characterized in that $Al_2O_3$ grains each having a fine $ZrO_2$ grain therein are dispersed in the composite ceramic material at a higher dispersion ratio than heretofore, and some of the $Al_2O_3$ grains each having the fine $ZrO_2$ grain therein are trapped within larger-sized $ZrO_2$ grains to form composite grains. The formation of such a nanocomposite structure provides further improvements in wear resistance, hardness, strength and toughness of the $ZrO_2$—$Al_2O_3$ ceramic material under a larger amount of $Al_2O_3$ than heretofore.

Therefore, the composite ceramic material of the present invention is expected to be preferably utilized in various application fields, for example, parts for industrial machine such as ferrule for optical fiber connector, bearings and dies, cutting tools such as scissor and saw blade, stationery goods, chemical goods such as mechanical seal and milling media, goods for sport, medical equipments such as surgical knife, biomaterial parts such as artificial joint, artificial bone, artificial dental root, abutment and crown.

What is claimed is:

1. A $ZrO_2$-$Al_2O_3$ composite ceramic material comprising a $ZrO_2$ phase containing 10 to 12 mol % of $CeO_2$ as a stabilizer and composed of 90 vol % or more of tetragonal $ZrO_2$, and an $Al_2O_3$ phase,
   wherein an amount of said $Al_2O_3$ phase in the composite ceramic material is in a range of 30 to 70 vol %,
   $Al_2O_3$ grains each having a fine $ZrO_2$ grain therein are dispersed in the composite ceramic material,
   some of the $Al_2O_3$ grains each having the fine $ZrO_2$ grain therein are trapped within $ZrO_2$ grains to form composite grains,
   a first dispersion ratio defined as a ratio of the number of the $Al_2O_3$ grains each having the fine $ZrO_2$ grain therein relative to the number of the entire $Al_2O_3$ grains dispersed in the composite ceramic material is 50% or more, and
   a second dispersion ratio defined as a ratio of the number of the $Al_2O_3$ grains of said composite grains relative to the number of the entire $Al_2O_3$ grains dispersed in the composite ceramic material is 0.3% or more.

2. The composite ceramic material as set forth in claim 1, wherein $ZrO_2$ grains each having an $Al_2O_3$ grain therein are dispersed in the composite ceramic material,
   a third dispersion ratio defined as a ratio of the number of the $Al_2O_3$ grains trapped within the $ZrO_2$ grains relative to the number of the entire $Al_2O_3$ grains dispersed in the composite ceramic material is 1.5% or more, and
   wherein the second dispersion ratio "R2" is 0.6% or more, and
   wherein the second dispersion ratio "R2" satisfies the following condition:

$$R2 \geq \alpha \times R3 \times R1/100$$

wherein "R1" is the first dispersion ratio, "R3" is the third dispersion ratio, and "α" is a coefficient determined within a range of 0.8 to 1 by taking account of measurement errors.

3. A method of producing the $ZrO_2$-$Al_2O_3$ composite ceramic material as set forth in claim 1 comprising the steps of:

mixing a first powder for providing said $ZrO_2$ phase with a second powder for providing said $Al_2O_3$ phase such that an amount of said $Al_2O_3$ phase in the composite ceramic material is in a range of 30 to 70 vol %;

molding a resultant mixture in a desired shape to obtain a green compact; and sintering said green compact in an oxygen-containing atmosphere, wherein the second powder contains $Al_2O_3$ particles each having a fine $ZrO_2$ particle therein, wherein some of the $Al_2O_3$ particles each having the fine $ZrO_2$ article therein becomes trapped within $ZrO_2$ particles to form composite grains, wherein a ratio of the number of the $Al_2O_3$ particles each having the fine $ZrO_2$ particle therein relative to the number of entire $Al_2O_3$ particles dispersed in the composite ceramic material is 50% or more, and wherein a ratio of the number of the $Al_2O_3$ particles of said composite grains the number of the entire $Al_2O_3$ articles dispersed in the composite ceramic material is 0.3% or more.

4. The method as set forth in claim 3, wherein a preparation process of the second powder comprises the step of adding a $ZrO_2$ powder to at least one selected from a $\theta$-$Al_2O_3$ powder and a $\gamma$-$Al_2O_3$ powder having a specific surface area of 50 to 400 m$^2$/g to obtain a mixed powder.

5. The method as set forth in claim 3, wherein a preparation process of the second powder comprises the steps of adding a $ZrO_2$ powder to one of an aqueous solution of an aluminum salt and an organic solution of an aluminum alkoxide, hydrolyzing a resultant mixture to obtain a precipitate, and drying the precipitate.

6. The method as set forth in claim 3, wherein a preparation process of the second powder comprises the steps of adding an aqueous solution of a zirconium salt to one of an aqueous solution of an aluminum salt and an organic solution of an aluminum alkoxide, hydrolyzing a resultant mixture to obtain a precipitate, and drying the precipitate.

7. The method as set forth in claim 4, comprising the step of calcining the mixed powder in an oxygen containing atmosphere at a temperature of 800° C. to 1300° C.

8. The method as set forth in claim 5, comprising the step of calcining the precipitate in an oxygen containing atmosphere at a temperature of from 800° C. to 1300° C.

9. The method as set forth in claim 6, comprising the step of calcining the precipitate in an oxygen containing atmosphere at a temperature of from 800° C. to 1300° C.

10. The method as set forth in claim 3, wherein a volume ratio of $Al_2O_3$:$ZrO_2$ in the second powder is in a range of 95:5 to 50:50.

11. The composite ceramic material as set forth in claim 1, wherein $ZrO_2$ grains each having an $Al_2O_3$ grain therein are dispersed in the composite ceramic material, a third dispersion ratio defined as a ratio of the number of the $Al_2O_3$ grains trapped within the $ZrO_2$ grains relative to the number of the entire $Al_2O_3$ grains dispersed in the composite ceramic material is 1.5% or more.

\* \* \* \* \*